United States Patent
Jaffrey et al.

(10) Patent No.: US 10,648,268 B2
(45) Date of Patent: May 12, 2020

(54) ANNUAL BLOWOUT PREVENTER WITH RADIAL ACTUATING MEMBER

(71) Applicant: Cameron International Corporation, Houston, TX (US)

(72) Inventors: Andrew Jaffrey, Oldmeldrum (GB); Gerrit M. Kroesen, Friendswood, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 85 days.

(21) Appl. No.: 14/840,506

(22) Filed: Aug. 31, 2015

(65) Prior Publication Data

US 2017/0058623 A1 Mar. 2, 2017

(51) Int. Cl.
- *E21B 33/06* (2006.01)
- *F16K 7/04* (2006.01)
- *F16K 31/46* (2006.01)

(52) U.S. Cl.
CPC .............. *E21B 33/06* (2013.01); *F16K 7/04* (2013.01); *F16K 31/465* (2013.01)

(58) Field of Classification Search
CPC ...... E21B 33/06; E21B 33/061; E21B 33/062; E21B 33/064; E21B 33/085; F16K 3/03; F16K 7/06; F16K 7/04; F16K 31/465; F16K 7/065; F16K 7/08
USPC .......... 251/1.1–1.3, 212, 294; 166/85.4, 84.3
See application file for complete search history.

(56) References Cited

U.S. PATENT DOCUMENTS

| | | | | |
|---|---|---|---|---|
| 1,840,967 A | * | 1/1932 | Martin | E21B 33/06 251/1.1 |
| 1,977,504 A | * | 10/1934 | Brown | E21B 35/00 138/109 |
| 2,434,835 A | * | 1/1948 | Colley | F16K 7/06 138/45 |
| 2,846,179 A | * | 8/1958 | Monckton | B65D 90/56 222/507 |
| 3,329,396 A | * | 7/1967 | Heaton | C03B 7/088 251/212 |
| 3,572,627 A | | 3/1971 | Jones | |
| 3,897,039 A | * | 7/1975 | Le Rouax | E21B 33/06 251/1.2 |
| 3,994,472 A | * | 11/1976 | Williams | E21B 33/06 251/1.2 |
| 4,007,904 A | * | 2/1977 | Jones | E21B 33/06 251/1.2 |
| 4,095,805 A | * | 6/1978 | Allen | E21B 33/06 251/1.1 |

(Continued)

OTHER PUBLICATIONS

International Search Report and Written Opinion of PCT Application No. PCT/US2016/047083 dated Nov. 11, 2016: pp. 1-14.

(Continued)

*Primary Examiner* — Craig J Price
*Assistant Examiner* — Andrew J Rost
(74) *Attorney, Agent, or Firm* — Helene Raybaud

(57) ABSTRACT

An annular blowout preventer (BOP) includes a housing comprising a bore extending through the housing, an annular sealing element configured to be displaced inwardly into the housing bore, and an actuating member configured to be actuated radially or perpendicularly with respect to an axis of the annular sealing element to compress the annular sealing element inwardly into the housing bore.

16 Claims, 5 Drawing Sheets

(56) References Cited

U.S. PATENT DOCUMENTS

| | | | |
|---|---|---|---|
| 4,310,139 A | | 1/1982 | Williams, III et al. |
| 4,372,026 A | | 2/1983 | Mosing |
| 4,447,037 A | * | 5/1984 | Huey ...................... E21B 33/06 |
| | | | 251/1.2 |
| 4,449,719 A | | 5/1984 | Radosay et al. |
| 4,452,421 A | | 6/1984 | Huey et al. |
| 4,458,876 A | * | 7/1984 | Schaeper ................ E21B 33/06 |
| | | | 251/1.2 |
| 5,116,017 A | | 5/1992 | Granger et al. |
| 5,273,108 A | * | 12/1993 | Piper ...................... E21B 33/06 |
| | | | 166/90.1 |
| 7,845,648 B2 | | 12/2010 | Keefe et al. |
| 2014/0174754 A1 | | 6/2014 | Smith |

OTHER PUBLICATIONS

International Preliminary Report on Patentability for the International patent application PCT/US2016/047083 dated Mar. 15, 2018.

\* cited by examiner

ANNULAR BLOWOUT PREVENTER WITH RADIAL ACTUATING MEMBER

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Blowout preventers (BOPs) are used extensively throughout the oil and gas industry. Typical blowout preventers are used as a large specialized valve or similar mechanical device that seal, control, and monitor oil and gas wells. The two categories of blowout preventers that are most prevalent are ram blowout preventers and annular blowout preventers. Blowout preventer stacks frequently utilize both types, typically with at least one annular blowout preventer stacked above several ram blowout preventers. The ram units in ram blowout preventers allow for both the shearing of the drill pipe and the sealing of the blowout preventer. A blowout preventer stack may be secured to a wellhead and may provide a safe means for sealing the well in the event of a system failure.

In a typical annular blowout preventer 100, such as shown in FIG. 1, the annular blowout preventer 100 includes a housing 102 with a bore 120 extending therethrough that is disposed about a longitudinal axis 103. A packing unit 105 is disposed within the annular blowout preventer 100 about the longitudinal axis 103 such that an axis of the packing unit 105 may be aligned or concentric with the axis 103. The packing unit 105 includes an elastomeric annular sealing element 107 and a plurality of metallic inserts 109. The metallic inserts 109 are disposed within the elastomeric annular sealing element 107 of the packing unit 105 and may be distributed at equal radial distances from one another about the longitudinal axis 103. The packing unit 105 includes a bore 111 concentric with the bore 120 of the blowout preventer 100.

The annular blowout preventer 100 is actuated by fluid pumped into an opening 113 of a piston chamber 112. The fluid applies pressure to a piston 117, which moves the piston 117 upward. As the piston 117 moves upward, the piston 117 translates force to the packing unit 105 through a wedge face 118. The force translated to the packing unit 105 from the wedge face 118 is directed upward toward a removable head 119 of the annular blowout preventer 100, and inward toward the longitudinal axis 103 of the annular blowout preventer 100. Because the packing unit 105 is retained against the removable head 119 of the annular blowout preventer 100, the packing unit 105 does not displace upward from the force translated to the packing unit 105 from the piston 117. However, the packing unit 105 compresses inward from the translated force, which compresses the packing unit 105 toward the longitudinal axis 103 of the annular blowout preventer 100. In the event a drill pipe is located along the longitudinal axis 103, with sufficient radial compression, the packing unit 105 will seal about the drill pipe into a "closed position." In the event a drill pipe is not present, the packing unit 105, with sufficient radial compression, will completely seal the bore 111 by sealing against itself.

The annular blowout preventer 100 may go through an analogous reverse movement when fluid is pumped into opening 115 of the piston chamber 112. The fluid translates downward force to the piston 117, such that the wedge face 118 of the piston 117 allows the packing unit 105 to radially expand to an "open position." Further, the removable head 119 of the annular blowout preventer 100 enables access to the packing unit 105, such that the packing unit 105 may be serviced or changed if necessary. Alternatively, the packing unit 105 may radially expand to the open position from the elastomeric body 107 biasing and pushing against the piston 117 when the piston 117 no longer applies a pressure to the packing unit 105, thereby enabling the packing unit 105 to expand and relax.

As annular blowout preventers may rely on the use of a piston 117 or some other vertical type of actuation, this may increase the height for the annular blowout preventer. Further, an annular blowout preventer is typically included within a stack, which even further increases the height requirement when installing equipment for pressure control purposes of a well. However, in certain environments and areas, the overall height available may be limited, such as due to the size restrictions when moving equipment on a platform or derrick, or to help protect the fishing industry in areas such as the North Sea. Accordingly, improvements may be made to current designs used for annular blowout preventers.

DESCRIPTION OF THE DRAWINGS

For a detailed description of embodiments of the subject disclosure, reference will now be made to the accompanying drawings in which.

DETAILED DESCRIPTION

Figure 1:
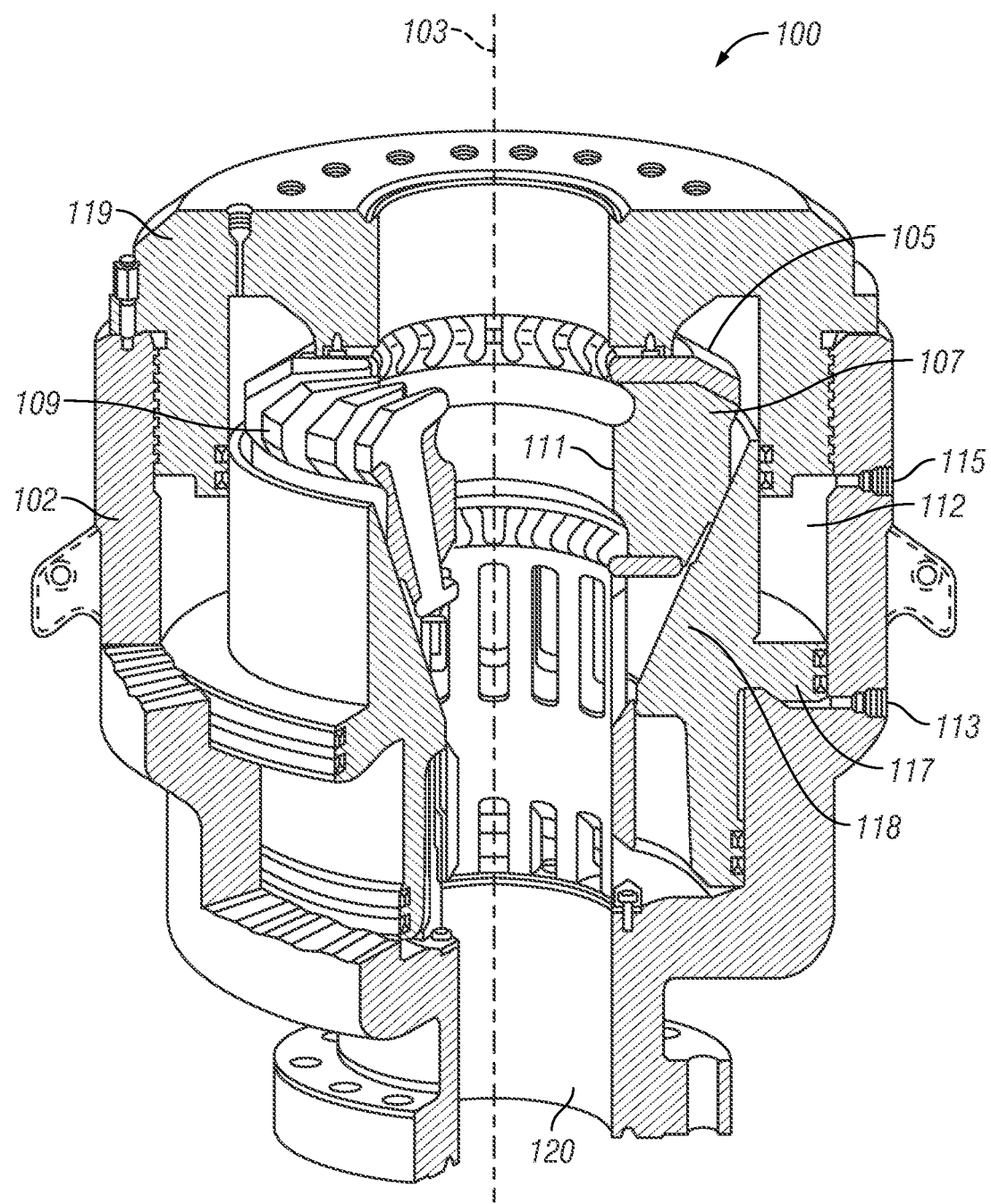
FIG. 1 shows a sectional view of an annular blowout preventer in accordance with one or more embodiments of the present disclosure.

The following discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. The embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be an illustration of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but are the same structure or function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," and variations of these terms is made for convenience, but does not require any particular orientation of the components.

In accordance with one or more embodiments, the present disclosure relates to an annular blowout preventer to apply a radial force to an annular sealing element of the sealing element/packing unit to compress or constrict the annular sealing element radially inwardly. For example, as shown in FIG. 1, the piston 117 moves in an axial direction to apply an axial force to the packing unit 105, which results in compressing, constricting, or axially displacing the annular sealing element radially inwardly. The present disclosure relates to applying a radial force, such as by moving an actuating member in a direction perpendicular to the axis or rotating the actuating member about the axis, to displace, move, compress, or constrict the annular sealing element radially inward. In one or more embodiments, this may reduce the overall height or size for an annular blowout preventer, such as by arranging an actuating member to move or be oriented in a direction perpendicular to the axis of the annular blowout preventer, as opposed to only a direction parallel to the axis of the annular blowout preventer.

Figure 2:
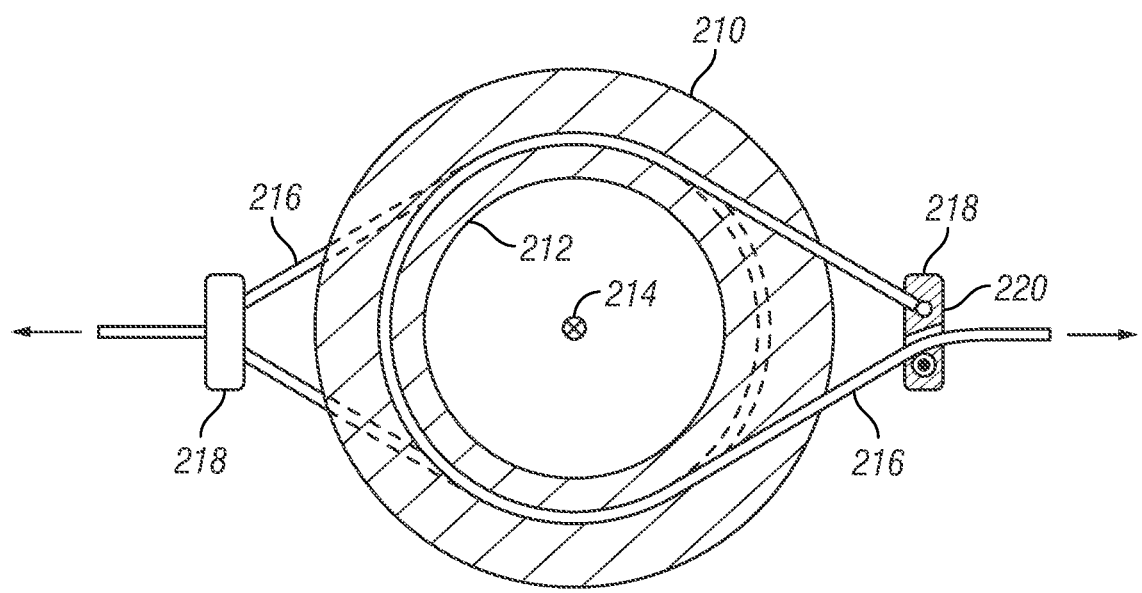
FIG. 2 shows a cross-sectional view of the annular sealing element and the actuating member in accordance with one or more embodiments of the present disclosure.
Figure 3:
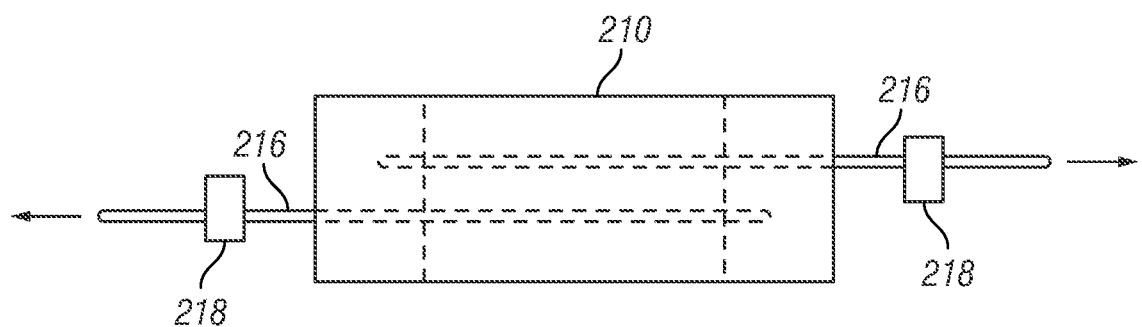
FIG. 3 shows a side view of an annular sealing element and an actuating member in accordance with one or more embodiments of the present disclosure.

Referring now to FIGS. 2 and 3, multiple views of an annular sealing element 210 and one or more actuating members 216 in accordance with one or more embodiments of the present disclosure are shown. In particular, FIG. 2 shows a cross-sectional view of the annular sealing element 210 and the actuating members 216, and FIG. 3 shows a side view of the annular sealing element 210 and the actuating members 216. Accordingly, the annular sealing element 210 includes a bore 212 formed through the annular sealing element 210 about an axis 214 of the annular sealing element 210. The annular sealing element 210 compresses inwardly toward the axis and creates a seal within the BOP housing and may include or be formed from one or more different materials, such as an elastomeric material, a composite material, and/or a fiber material. Further, the annular sealing element 210 may include one or more rigid inserts positioned within and about the annular sealing element 210.

As mentioned above, the actuating members 216 may be included with an annular BOP. The actuating members 216 are used to apply a force, such as a radial force, to the annular sealing element 210 to compress the annular sealing element 210 inwardly toward the axis 214. In particular, the actuating members 216 apply substantially only a radial force to the annular sealing element 210 to compress the annular sealing element 210 inwardly toward the axis 214. In one or more embodiments, to apply a radial force to the annular sealing element 210, the actuating members 216 are positioned in perpendicular alignment with the annular sealing element 210 with respect to the axis 214. Such a configuration enables the actuating member(s) 216 to apply a radial force, which may only be a radial force, to the annular sealing element 210 and compress the annular sealing element 210 inwardly toward the axis 214. Further, the actuating members 216 are used to apply a force that is perpendicular with respect to the axis 214 to the annular sealing element 210. The force may only be a perpendicular force, in that the force generated by the actuating members 216 is only in a direction that is perpendicular with respect to the axis 214.

In this embodiment, the actuating member(s) 216 include a cable or similar component (e.g., a wire or a line). The actuating members 216 are positioned within the annular sealing element 210 and at least partially about the axis 214 of the annular sealing element 210. For example, one or more channels are formed within the annular sealing element 210 with the actuating members 216 positioned within the channels of the annular sealing element 210. Further, the channels may also include support members or a protective sheath to support the actuating members 216 when moving, sliding within, and applying force to the annular sealing element 210.

The actuating members 216 are shown as coupled at one end to a support head 218, and then coupled at another end to an actuator (discussed more below) to actuate and move the actuating members 216. Further, the actuating members 216 are routed through the support heads 218, such as to extend through apertures 220 formed within the support heads 218, so that the actuating members 216 slidingly engage the support heads 218. This allows the actuating members 216 to tighten upon the annular sealing element 210 through the support heads 218. The support heads 218 may also be fixed relative to the actuating members 216 and/or annular sealing element 210 to provide support and alignment to the actuating members 216 during actuation. Accordingly, as the actuating members 216 are actuated, the actuating members 216 apply a radial force to the annular sealing element 210 and compress the annular sealing element 210 inwardly. This enables the annular sealing element 210 form a seal about a tubular member when positioned within the bore 212 of the annular sealing element 210. Alternatively, if no tubular member or object is present within the bore 212 of the annular sealing element 210, the annular sealing element 210 may form a seal about itself to fully constrict and seal off the bore 212.

Figure 4:
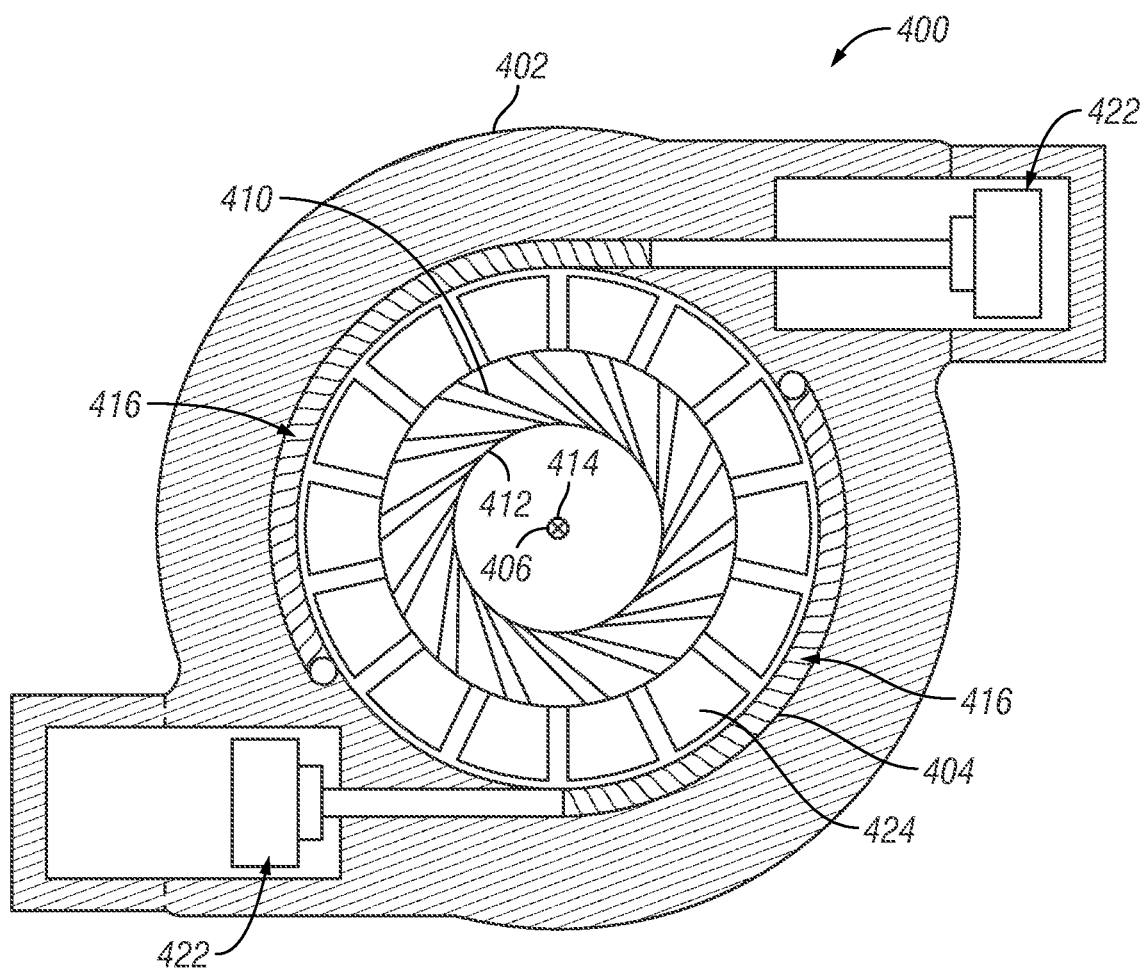
FIG. 4 shows a cross-sectional view of an annular blowout preventer in accordance with one or more embodiments of the present disclosure.

Referring now to FIG. 4, a cross-sectional view of an annular BOP 400 in accordance with one or more embodiments of the present disclosure is shown. The annular BOP 400 includes a BOP housing 402 that has a bore 404 extending through the BOP housing 402. An annular sealing element 410 also includes a bore 412 formed through the annular sealing element 410. The annular sealing element 410 is positioned within the BOP housing 402 such that the annular sealing element bore 412 is aligned with the BOP housing bore 404.

Similar to the embodiment of FIGS. 2 and 3, one or more actuating members 416 are used to apply a radial force to the annular sealing element 410 to compress the annular sealing element 410 inwardly into the BOP housing bore 404. In this and other embodiments, the actuating members 416 are shown as cables. The actuating members 416 are positioned at least partially about the annular sealing element 410 (e.g., an exterior of the annular sealing element 410). The actuating members 416 may be secured or coupled at one end to the BOP housing 402, and then coupled at another end to an actuator 422 to move the actuating members 416. An actuating member in accordance with the present disclosure may be hydraulically actuated, pneumatically actuated, electrically actuated, and/or mechanically actuated. An actuator in accordance with the present disclosure may be a hydraulic actuator, pneumatic actuator, electrical actuator, and/or mechanical actuator. As shown in FIG. 4, the actuator 422 may include a hydraulic actuator that hydraulically actuates the actuating members 416.

In one or more embodiments, the annular BOP 400 may also include one or more camming members 424 or pusher plates to facilitate the engagement between the actuating members 416 and the annular sealing element 410 and distribute the force from the actuating members 416 to the annular sealing element 410. For example, as shown in FIG. 4 the camming members 424 may be positioned or distributed about the annular sealing element 410. The camming members 424 may be coupled to each other, such as to facilitate movement of the camming members 424 with respect to each other. The camming members 424 may also have curved interior and/or exterior surfaces to facilitate engagement between the camming members 424, the annular sealing element 410, and the actuating members 416.

As the actuating members 416 are actuated, the actuating members 416 apply a radial force to the camming members 424 to compress the camming members 424 radially inwards. The camming members 424 then apply and distribute the radial force from actuating members 416 to the annular sealing element 410 and compress the annular sealing element 410 inwards. This enables the annular sealing element 410 form a seal about a tubular member when positioned within the bore 412 of the annular sealing element 410. Alternatively, if no tubular member or object is present within the annular sealing element bore 412, the annular sealing element 410 may form a seal about itself to fully constrict the bore 412.

Figure 5:
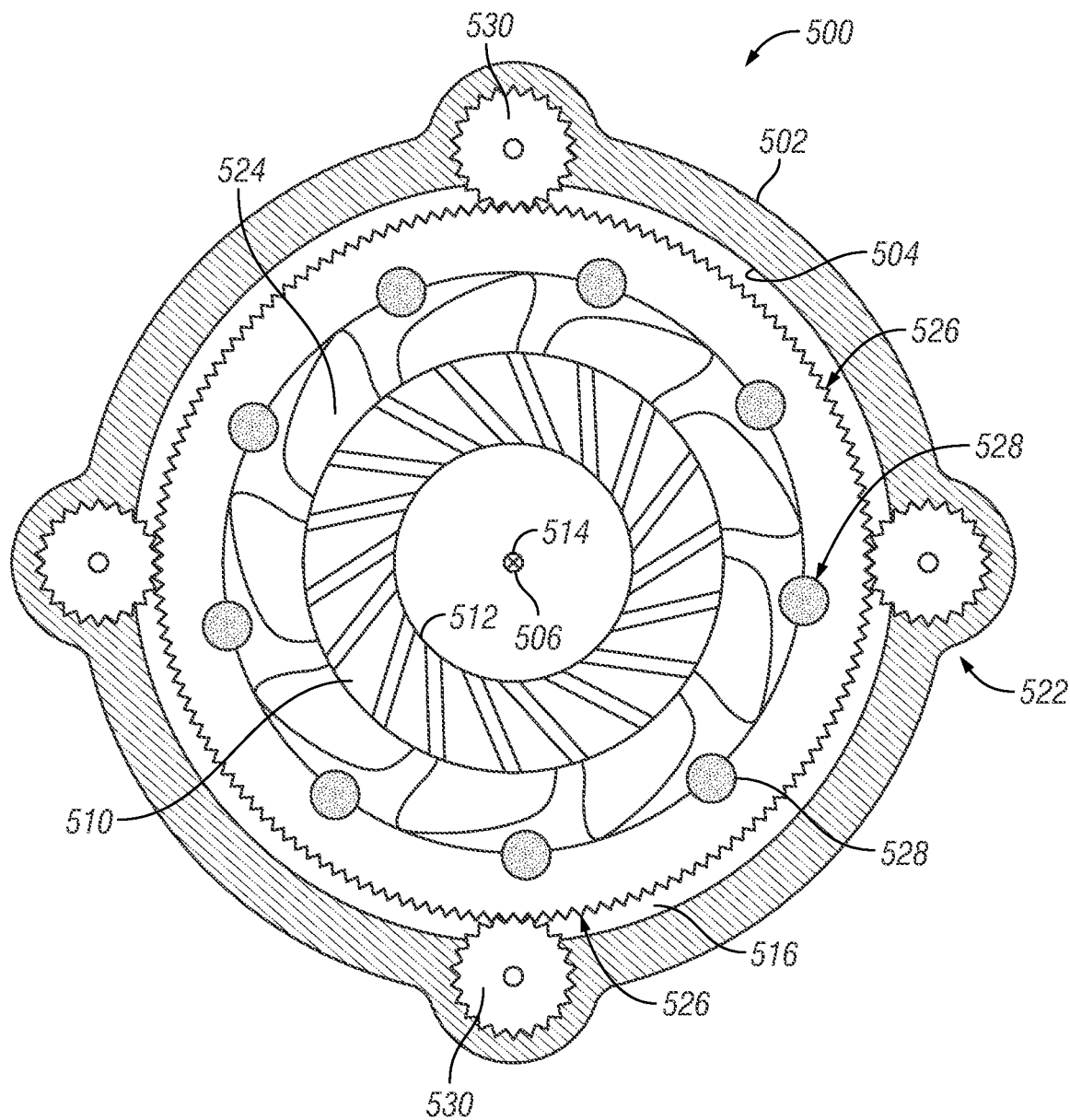
FIG. 5 shows a cross-sectional view of an annular blowout preventer in accordance with one or more embodiments of the present disclosure.
Figure 6:
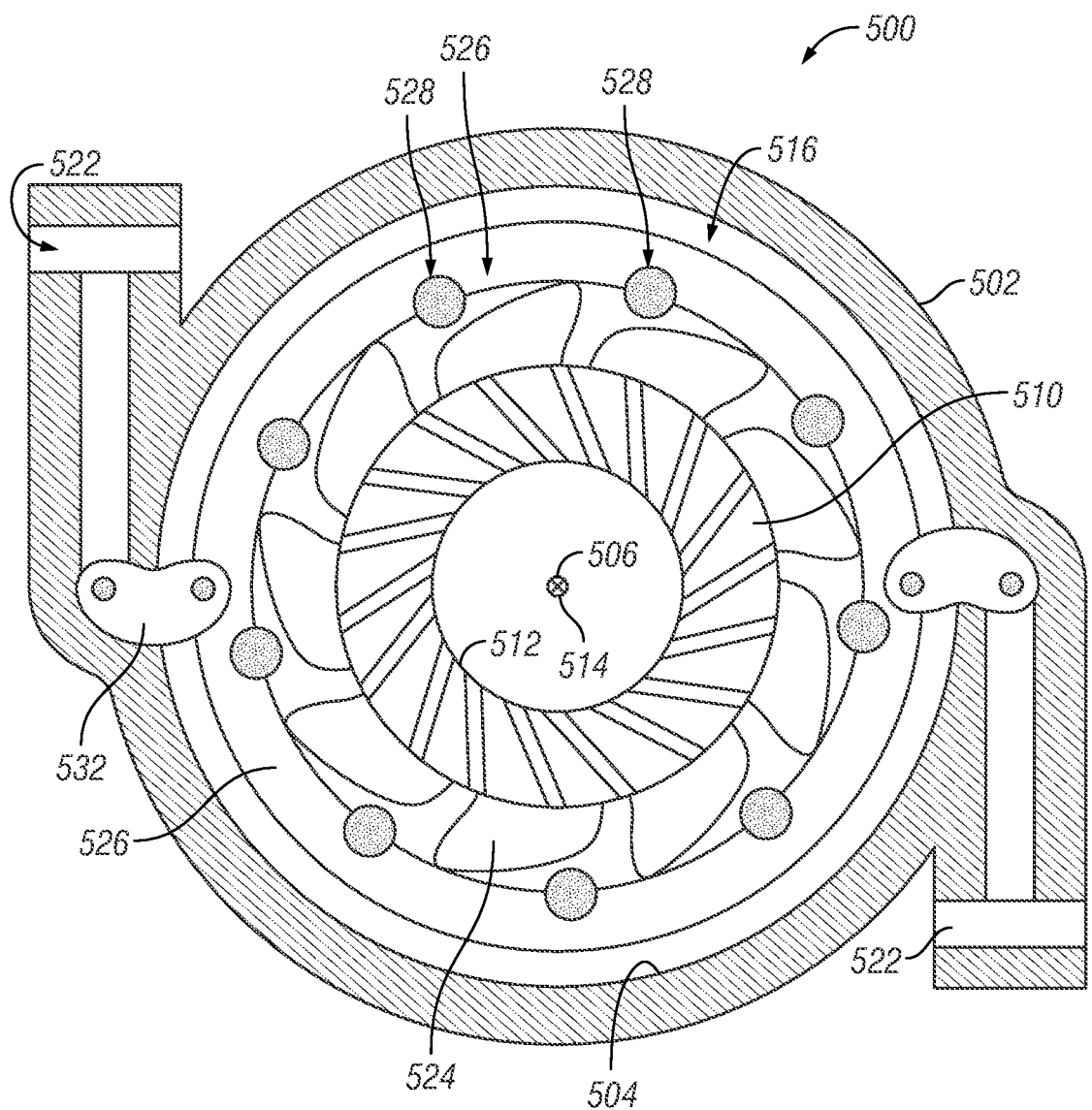
FIG. 6 shows a cross-sectional view of an annular blowout preventer in accordance with one or more embodiments of the present disclosure.

Referring now to FIGS. 5 and 6, multiple cross-sectional views of an annular BOP 500 in accordance with one or more embodiments of the present disclosure are shown. The annular BOP 500 includes a BOP housing 502 with a bore 504 extending through the BOP housing 502. An annular sealing element 510 includes a bore 512 formed through the annular sealing element 510. The annular sealing element 510 is positioned within the BOP housing 502 such that the annular sealing element bore 512 is aligned with the BOP housing bore 504.

In this embodiment, an actuating member 516 is positioned within the BOP housing 502 about the annular sealing element 510. The actuating member 516, as shown, includes a ring 526 with one or more engagement members 528 or pusher posts. The engagement members 528 may be coupled to or received within the ring 526 such that the engagement members 528 rotate about the axis 506 along with the ring 526.

The actuating member 516 is positioned about the annular sealing element 510 and operably coupled to an actuator 522 to rotate the actuating member 516. In particular, as shown in FIG. 5, the actuator 522 may be operably coupled to the actuating member 516 by having one or more gears 530 engage the ring 526 of the actuating member 516. In this embodiment, the gear 530 may engage the exterior of the ring 526 through one or more corresponding teeth. Further, a motor, such as an electric motor, may then rotate the gear 530 to rotate the ring 526. In particular, as the ring 526 rotates, the engagement members 528 may engage the camming members 524 to move and displace the camming members radially inwardly. This results in a radial force upon the annular sealing element 510 to the compress and constrict upon the axis 506.

In FIG. 6, the actuator 522 is operably coupled to the actuating member 516 through one or more links 532 to rotate the ring 526 of the actuating member 516. The actuator 522 may include a piston with a rod extending between the piston and the link 532, in which movement of the piston then corresponds to rotation of the ring 526. The links 532 may be rotationally coupled to and between the ring 526 and a rod of the piston of the actuator 522. As the actuators 522 move, the links 532 may translate the linear movement of the actuators 522 to the rotation of the ring 526.

Further, the annular BOP 500 includes one or more camming members 524 to facilitate the engagement between the actuating member 516 and the annular sealing element 510 and distribute the force from the actuating members 516 to the annular sealing element 510. For example, the camming members 524 may be positioned or distributed about the annular sealing element 510 and between the actuating member 516 to the annular sealing element 510, and may be similar to the camming members 524 discussed above.

Accordingly, as the actuating members 516 are actuated and rotate about the axis 514, the engagement members 528 of the ring 526 apply a radial force to the camming members 524 to compress the camming members 524 radially inwardly toward the axis 514. The camming members 524 may then apply and distribute the radial force from actuating members 516 to the annular sealing element 510 and compress the annular sealing element 510 inwardly. As above, the annular sealing element 510 may form a seal about a tubular member when positioned within the bore 512 of the annular sealing element 510. Alternatively, if no tubular member or object is present within the bore 512 of the annular sealing element 510, the annular sealing element 510 may form a seal about itself to fully constrict the bore 512.

Further, in one or more embodiments, a sensor may be used to detect if an object is present within a bore of a blowout preventer, and/or the sensor may be used to measure a size of the object present within the bore of the blowout preventer. The sensor may be operably coupled to the blowout preventer housing (e.g., positioned above, below, adjacent, and/or within the bore of the blowout preventer housing), in which the sensor may then generate a signal based upon the presence or size of an object within the bore of the blowout preventer housing. The actuating member may then be moved or rotated to apply a selective radial force to the annular sealing element based upon the signal from the sensor. For example, if the sensor detects an object within the bore of the blowout preventer housing, the sensor may provide a signal based upon this measurement, and the actuating member may then selectively be controlled to apply a particular radial force to the annular sealing element. This may involve increasing the radial force to the annular sealing element, such as if needed to seal upon an object or tubular member smaller than normal or expected, or decreasing the radial force to the annular sealing element, such as if needed to seal upon an object or tubular member larger than normal or expected.

Although the present invention has been described with respect to specific details, it is not intended that such details should be regarded as limitations on the scope of the invention, except to the extent that they are included in the accompanying claims.

What is claimed is:

1. A method of actuating an annular blowout preventer (BOP) including a BOP housing, comprising:
compressing an annular sealing element radially inward into a bore extending through the BOP housing by actuating an actuating member positioned about at least a portion of the annular sealing element in a direction perpendicular to an axis of the bore to apply only a radial force to a plurality of camming members that are distinct from the actuating member and positioned between an inner surface of the actuating member and an outer surface of the annular sealing element and rotatable about an axis parallel to the bore to distribute the force from the actuating member to the annular sealing element, wherein the actuating member comprises at least one of a cable, a wire, or a line and actuating the actuating member comprises rotating the actuating member to cause the plurality of camming members to move relative to one another to distribute the force to the annular sealing element; and
forming a seal with the annular sealing element within the BOP housing.

2. The method of claim 1, wherein forming the seal with the annular sealing element comprises one of:
forming a seal about a tubular member positioned within the bore of the BOP; or
forming a seal about the annular sealing element.

3. The method of claim 1, further comprising positioning the annular sealing element and the actuating member on a plane perpendicular to the bore of the BOP housing.

4. An annular blowout preventer (BOP), comprising:
a housing comprising a bore extending through the housing;
a unitary annular sealing element configured to be displaced inwardly into the bore;
an actuating member positioned within the housing and positioned at least partially about the unitary annular sealing element and actuatable in a direction perpendicular to an axis of the bore to apply only a radial force to compress the unitary annular sealing element inwardly into the bore; and
a plurality of camming members that are distinct from the actuating member and are positioned between an inner surface of the actuating member and an outer surface of the unitary annular sealing element and rotatable about an axis parallel to the bore to distribute the force from the actuating member to the unitary annular sealing element;
wherein the actuating member comprises at least one of a cable, a wire, or a line.

5. The annular BOP of claim 4, wherein the actuating member is configured to move in a direction perpendicular to the axis of the bore to apply the radial force to the unitary annular sealing element.

6. The annular BOP of claim 4, wherein the actuating member is configured to rotate about the bore to apply the radial force to the unitary annular sealing element to compress the unitary annular sealing element.

7. The annular BOP of claim 4, wherein the unitary annular sealing element and the actuating member are both positioned on a plane perpendicular to the bore of the housing.

8. The annular BOP of claim 7, wherein the actuating member is positioned at least partially radially about the unitary annular sealing element.

9. The annular BOP of claim 4, further comprising an actuator operably coupled to the actuating member and configured to move the actuating member with respect to the unitary annular sealing element.

10. The annular BOP of claim 4, wherein the actuating member comprises a ring including a plurality of engagement members, the ring positioned about the plurality of camming members and configured to distribute the force to the unitary annular sealing element through the plurality of camming members.

11. The annular BOP of claim 4, wherein the actuating member is at least one of hydraulically actuated, pneumatically actuated, electrically actuated, or mechanically actuated.

12. The annular BOP of claim 4, wherein the unitary annular sealing element is configured to form a seal about a tubular member within the bore of the housing.

13. The annular BOP of claim 4, wherein the unitary annular sealing element comprises a plurality of rigid inserts positioned within the unitary annular sealing element.

14. The annular BOP of claim 4, wherein the unitary annular sealing element comprises at least one of an elastomeric material, a composite material, or a fiber material.

15. The annular BOP of claim 4, wherein the actuating member couples to an interior surface of the housing.

16. The annular BOP of claim 4, wherein the actuating member comprises a first actuating member and a second actuating member.

* * * * *